US009267808B2

(12) United States Patent
Nagasawa et al.

(10) Patent No.: US 9,267,808 B2
(45) Date of Patent: Feb. 23, 2016

(54) VISUAL GUIDANCE SYSTEM

(71) Applicant: Fuji Jukogyo Kabushiki Kaisha, Tokyo (JP)

(72) Inventors: Isamu Nagasawa, Tokyo (JP); Noriyoshi Matsuo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 14/034,841

(22) Filed: Sep. 24, 2013

(65) Prior Publication Data

US 2014/0092250 A1 Apr. 3, 2014

(30) Foreign Application Priority Data

Sep. 28, 2012 (JP) ................. 2012-217939

(51) Int. Cl.
*H04N 7/18* (2006.01)
*G01C 21/36* (2006.01)
*G09G 5/377* (2006.01)
*G09G 3/00* (2006.01)

(52) U.S. Cl.
CPC .......... *G01C 21/365* (2013.01); *G01C 21/3602* (2013.01); *G09G 3/002* (2013.01); *G09G 5/377* (2013.01); *H04N 7/183* (2013.01); *G09G 2380/10* (2013.01)

(58) Field of Classification Search
CPC ............ B60R 1/00; H04N 7/181; G08G 1/04; G08G 1/0175
USPC .................................. 348/148–149
See application file for complete search history.

(56) References Cited

U.S. PATENT DOCUMENTS

| 8,521,411 B2 | 8/2013 | Grabowski et al. |
| 2009/0005961 A1* | 1/2009 | Grabowski et al. ........... 701/200 |
| 2012/0170130 A1 | 7/2012 | Sasaki et al. |

FOREIGN PATENT DOCUMENTS

| JP | 09-034352 A | 2/1997 |
| JP | 09-229707 A | 9/1997 |
| JP | 2003-030799 A | 1/2003 |
| JP | 2004-117294 A | 4/2004 |
| JP | 2006-284458 A | 10/2006 |
| JP | 2007-272350 A | 10/2007 |
| JP | 2008-501956 A | 1/2008 |
| JP | 2008-062762 A | 3/2008 |
| JP | 2008-151752 A | 7/2008 |
| JP | 2009-239621 A | 10/2009 |
| WO | WO 2005/121707 A2 | 12/2005 |
| WO | WO 2005/121707 A3 | 12/2005 |

OTHER PUBLICATIONS

Japanese Office Action (Notification of Reasons for Refusal dated Jan. 28, 2014) and Decision of Grant dated Aug. 26, 2014.

* cited by examiner

*Primary Examiner* — Chikaodili E Anyikire
(74) *Attorney, Agent, or Firm* — McGinn IP Law Group PLLC

(57) ABSTRACT

A visual guidance system includes an image display to present an image overlaid on a windshield in front of a driver of a vehicle and a processor to output image information on the image display. The processor outputs image information for presenting a virtual line extending from an upper side of the driver to a visual guidance target seen within the windshield in such a manner that the virtual line is overlaid on the windshield.

16 Claims, 11 Drawing Sheets

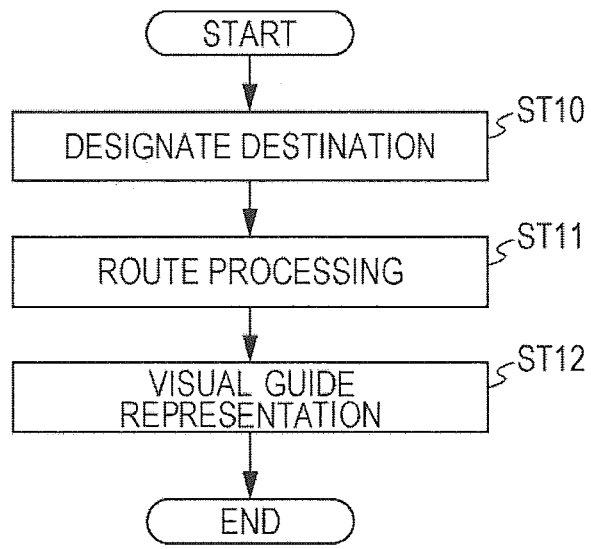
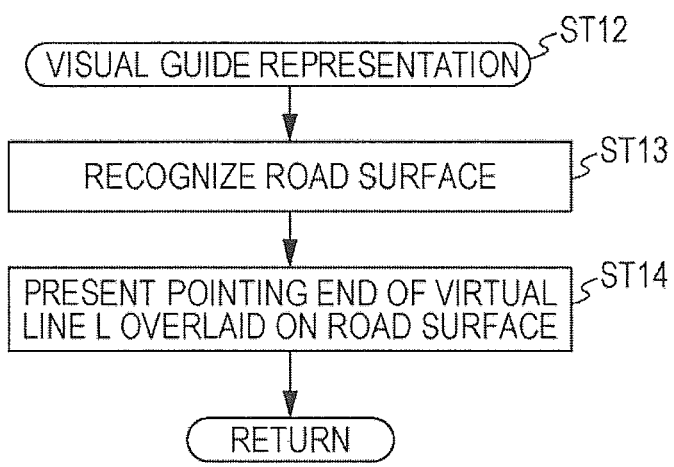

VISUAL GUIDANCE SYSTEM

CROSS-REFERENCE TO RELATED APPLICATIONS

The present application claims priority from Japanese Patent Application No. 2012-217939 filed on Sep. 28, 2012, the entire contents of which are hereby incorporated by reference.

BACKGROUND

1. Field of the Invention

The present invention relates to a visual guidance system for guiding a gaze of a driver of a vehicle such as an automobile.

2. Related Art

Currently, a car navigation system showing a route to a destination to a driver is widely used in a vehicle such as an automobile. In general, the car navigation system uses a display installed on a dashboard to show road guidance.

In Japanese Unexamined Patent Application Publication (Translation of PCT Application) (JP-T) No. 2008-501956, an image of a cable is presented to indicate a route is that the vehicle should follow over an actual road that is seen from a driver's seat.

In Japanese Unexamined Patent Application Publication (JP-A) No. 2004-117294, a mark corresponding to a route is presented in a three-dimensional display in the air over a road corresponding to the route.

In JP-A No. 9-34352, a graphic for guidance is changed in accordance with a distance between the vehicle and a guiding point.

However, even if various kinds of car navigation systems such as described are used, a burden imposed on the driver is heavy.

For instance, in a car navigation system, in general, a guidance route is not presented in association with an actual road that is seen from the driver's seat, and is presented separately from the actual road. In this case, the driver has to recognize a course on the basis of a route represented by a route indication, associate the recognized course and a real road, identify the road that the driver has to enter from among real roads on the basis of the correspondence therebetween, and perform a driving operation. It takes some time from when the route is presented to when the driver performs a driving operation by identifying the road that the driver should enter.

On the driving route of the vehicle and around the vehicle, there are pedestrians, other vehicles, an object fallen on the road, and the like. While the driver finds the route on the basis of the indication by the car navigation system, makes determination, and further performs an operation, the driver has to pay necessary attention to these objects, and drive the vehicle avoiding these objects.

Accordingly, there is a need for a visual guidance system for a vehicle such as an automobile that reduces a burden imposed on a driver.

SUMMARY OF THE INVENTION

In order to reduce the burden imposed on the driver, it is an object of the present invention is to guide the gaze of the driver to a visual guidance target.

An aspect of the present invention provides a visual guidance system including: an image display to present an image overlaid on a windshield in front of a driver of a vehicle; and a processor to output image information on the image display. The processor outputs image information for presenting a virtual line extending from above the driver to a visual guidance target seen within the windshield in such a manner that the virtual line is overlaid on the windshield.

Preferably, the processor outputs image information which extends from above the driver to along a course of the vehicle seen within the windshield in such a manner that a pointing end of the virtual line is overlaid on a road surface on the course seen within the windshield.

Preferably, the processor outputs image information for presenting the virtual line in such a manner that a pointing end of the virtual line becomes narrower.

Preferably, the visual guidance system further includes a vehicle speed detector to detect the speed of the vehicle. The processor outputs the image information for presenting the virtual line in such a manner that the pointing end of the virtual line extends to a point on the road surface far away from the driver in accordance with increase in the value of the vehicle speed.

Preferably, the visual guidance system further includes a steering input detector to detect a steering input. The processor outputs image information for changing the representation of the virtual line when the steering input detector detects a steering input.

Preferably, the visual guidance system further includes a braking input detector to detect a braking input. When the braking operation detector detects a braking input, the processor outputs image information for changing the representation of the virtual line.

Preferably, the visual guidance system further includes a camera to capture an image within a visual field range of the driver in front of the vehicle; and a road surface recognizer unit to recognize the road surface in front of the vehicle, on the basis of the image captured by the camera, and the processor outputs image information in which the pointing end of the virtual line is overlaid on the road surface thus recognized.

Preferably, the camera is a stereo camera unit.

Preferably, the visual guidance system further includes a gaze detector to detect a gaze of the driver. The processor outputs image information for a representation that is suitable for the gaze height, gaze direction, or gaze state of the driver, in accordance with information provided by the gaze detector.

Preferably, the image display is an image projector to project an image onto the windshield, and the processor outputs image information for causing the image projector to change the representation of the virtual line in accordance with the vehicle speed provided by the vehicle speed detector, so that the virtual line seen by the driver extends from an upper edge of the windshield to a road surface.

BRIEF DESCRIPTION OF THE DRAWINGS

FIG. 3 is an entire flowchart illustrating the visual guidance system according to the first example of the present invention;

FIG. 4 is a flowchart illustrating a visual guide presenting procedure of the visual guidance system according to the first example of the present invention;

DETAILED DESCRIPTION

Hereinafter, examples of the present invention will be described with reference to the drawings.

First Example

FIGS. 1 to 5 illustrate a first example of the present invention. A visual guidance system according to the first example of the present invention will be described with reference to FIG. 1.

Figure 1:
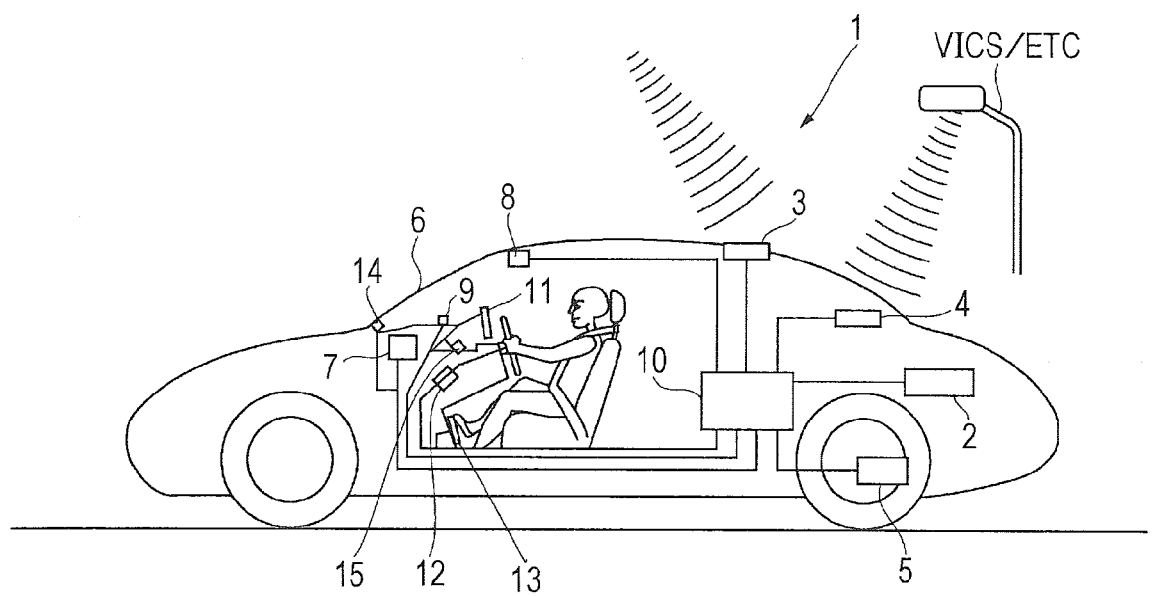
FIG. 1 is an overview of a visual guidance system according to a first example of the present invention.

FIG. 1 is an overview of the visual guidance system according to the first example of the present invention. A visual guidance system 1 includes a map information database 2, a Global Positioning System (GPS) antenna 3, a windshield 6 installed in front of a driver, an image projection unit 7 serving as the image display, and a processing unit 10 for outputting desired route information from GPS information obtained by the GPS antenna 3 and map information given by the map information database 2. Further, the visual guidance system 1 includes an antenna 4 for intelligent transportation system communication such as a Vehicle Information and Communication System (VICS) and an Electronic Toll Collection System (ETC), and obtains traffic information and makes payment at a toll road.

A vehicle speed sensor 5 is provided at a rear wheel of the vehicle to provide detected vehicle speed information, which is input to the processing unit 10. In a cabin, a stereo camera unit 8 including two cameras is provided to capture images in front of and outside of the vehicle. The stereo camera unit 8 uses the parallax thereof to measure the distance to the road surface or an object in front of the vehicle. Further, in the cabin, provided are a gaze detection unit 9 for detecting a gaze of the driver, an operation unit 11 for setting a destination desired by the driver, a microphone 15 for setting the destination by voice, and an illuminance sensor 14 for detecting brightness.

The processing unit 10 also receives information from a steering input detection unit 12 for detecting a driver's steering operation and a braking input detection unit 13 for detecting a driver's braking operation. Further, a side camera 19 (see FIG. 2) is provided to detect and capture an image of the outside of the visual field range of the driver and the outside of the display range of the image display.

Figure 2:
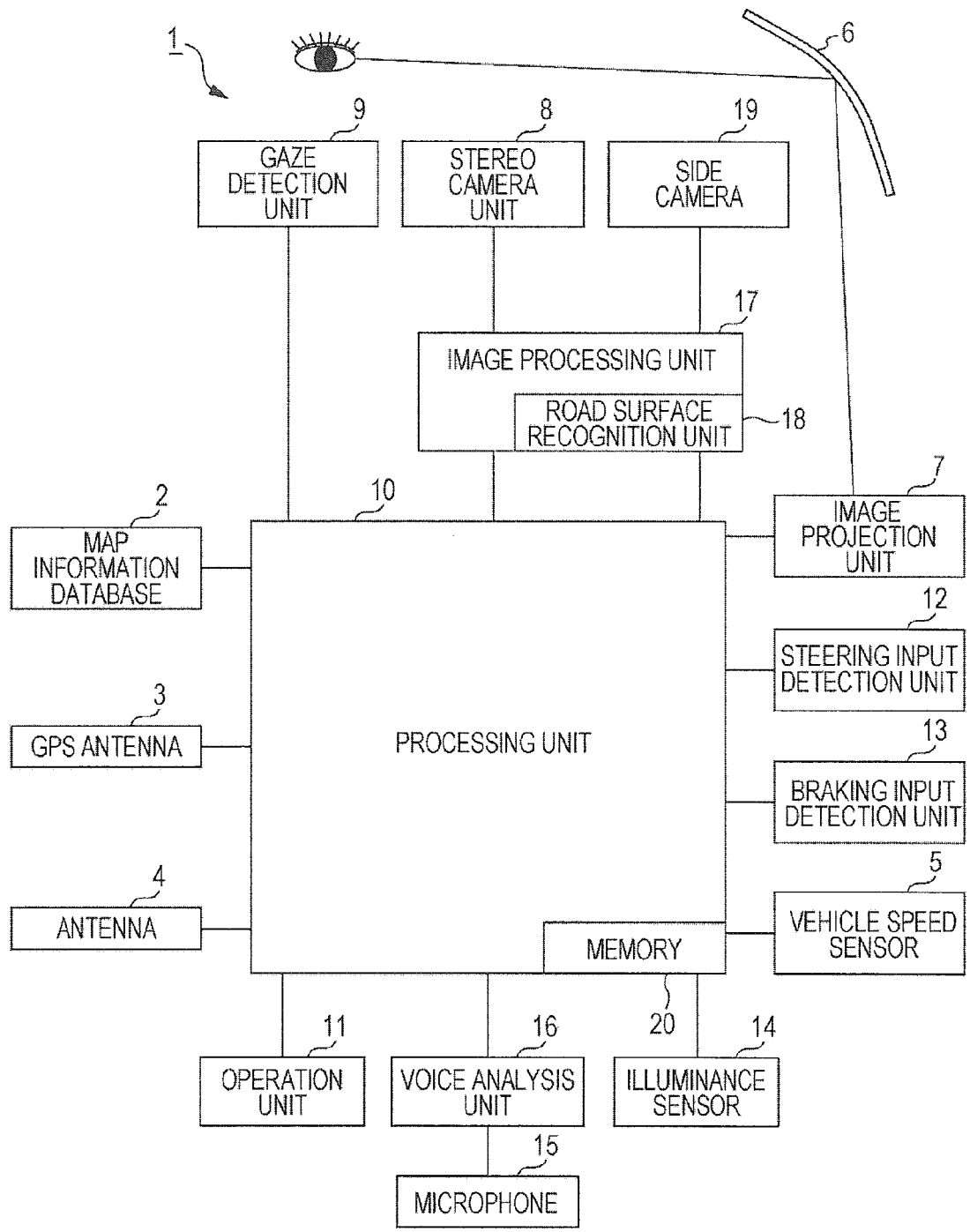
FIG. 2 is a block configuration diagram illustrating the visual guidance system according to the first example of the present invention.

Next, the configuration members connected to the processing unit 10 will be described while the processing unit 10 will be mainly explained. FIG. 2 is a block configuration diagram illustrating the visual guidance system according to the first example of the present invention. The processing unit 10 is connected to the map information database 2, the GPS antenna 3, the antenna 4, the vehicle speed sensor (vehicle speed detection unit) 5, the image projection unit 7, the stereo camera unit 8 stereo camera unit 8 and the side camera 19 via an image processing unit 17, the gaze detection unit 9, the operation unit 11, the steering input detection unit 12, the braking input detection unit 13, the illuminance sensor 14, t microphone 15 via a voice analysis unit 16, and the side camera 19.

The processing unit 10 receives information from the vehicle speed sensor 5, the gaze detection unit 9 to change the shape of a virtual line L, the shape being to be presented on the windshield 6. The virtual line L according to the present example serves as a course guiding line indicating the driving direction of the vehicle or a visual guide to a visual guidance target. The processing unit 10 also receives information from the operation unit 11 provided in the cabin, information from the steering input detection unit 12 which detects a steering operation by the driver, information from the braking input detection unit 13 which detects a braking operation by the driver, illuminance information around the windshield 6 measured by the illuminance sensor 14, and information from the microphone 15 (information obtained by audio analysis performed by the voice analysis unit 16).

The processing unit 10 also changes the shape of the virtual line L to be presented in accordance with the information from the steering input detection unit 12 which detects a steering operation by the driver and the information from the braking input detection unit 13 which detects a braking operation by the driver. Further, the processing unit 10 changes the density, the brightness, and the like of the virtual line L on the basis of illuminance information around the windshield 6 provided by the illuminance sensor 14, thereby allowing the driver to easily see the virtual line L.

Next, the details will be described using a flowchart of the visual guidance system and a figure of an operation state of the visual guidance system including the state when the driver sees from a driver's seat. FIG. 3 is an entire flowchart illustrating the visual guidance system according to the first example of the present invention.

The driver designates the destination using the operation unit 11 provided in the cabin. The driver can designate the destination also by speaking the destination into the microphone 15 which detects the driver's voice, whereby the voice analysis unit 16 performs audio analysis (step ST10).

The processing unit 10 performs route processing in accordance with the designated destination (step ST11). In the route processing, the processing unit 10 obtains the position of the vehicle and the azimuth of the vehicle using the GPS information obtained by the GPS antenna 3 and the map information of the map information database 2, and calculates a desired route to the destination. The memory 20 stores the map information required for the route and the route guiding. When the position of the vehicle based on the GPS information is determined not to be on the route while driving, the route is calculated as necessary, and the information in the memory 20 is rewritten.

The image projection unit 7 presents, on the windshield 6, the virtual line L, road information, and the like which are processed on the basis of the route and the map information to the destination stored in the memory 20 of the processing unit 10 (step ST12). In this visual guide presenting procedure, the processing unit 10 also uses information about the road surface received from the stereo camera unit 8 and information about the distances to the road surface and to the object outside of the vehicle.

The image captured by the stereo camera unit 8 is processed by the image processing unit 17, and then, a road surface recognition unit 18 recognizes the road surface. In parallel, the image processing unit 17 analyzes the relative speed and the distance from an object within a range captured by the stereo camera unit 8. Accordingly, the processing unit 10 uses not only the route and the map information but also information about the road surface and the distance to process information which is to be presented. The processing unit 10 changes the display shape of the virtual line L to be presented in accordance with the vehicle speed, and transmits information which is to be presented on the windshield 6 to the image projection unit 7.

The processing unit 10 obtains information on the gaze height, gaze direction, or gaze state of the driver using the gaze detection unit 9, and adjusts the shape, position and size an image to be presented on the windshield 6 such that the driver can easily see the image (see FIG. 12 to be described later).

In this first example, the image projection unit 7 is used as the image display, but a transparent organic EL sheet may be provided on the windshield, and the information may be directly presented on the sheet. In this case, the processing unit 10 outputs image information to the organic EL sheet.

A typical visual guide presenting procedure of the visual guidance system according to the present invention will be described with reference to a flowchart of FIG. 4. FIG. 4 is a flowchart illustrating the visual guide presenting procedure of the visual guidance system according to the first example of the present invention.

In the visual guide presenting procedure in step ST12, the road surface recognition unit 18 recognizes the image which is captured by the stereo camera unit 8 and processed by the image processing unit 17, and transmits this information to the processing unit 10. As a result, the road surface is (step ST13).

Figure 5:
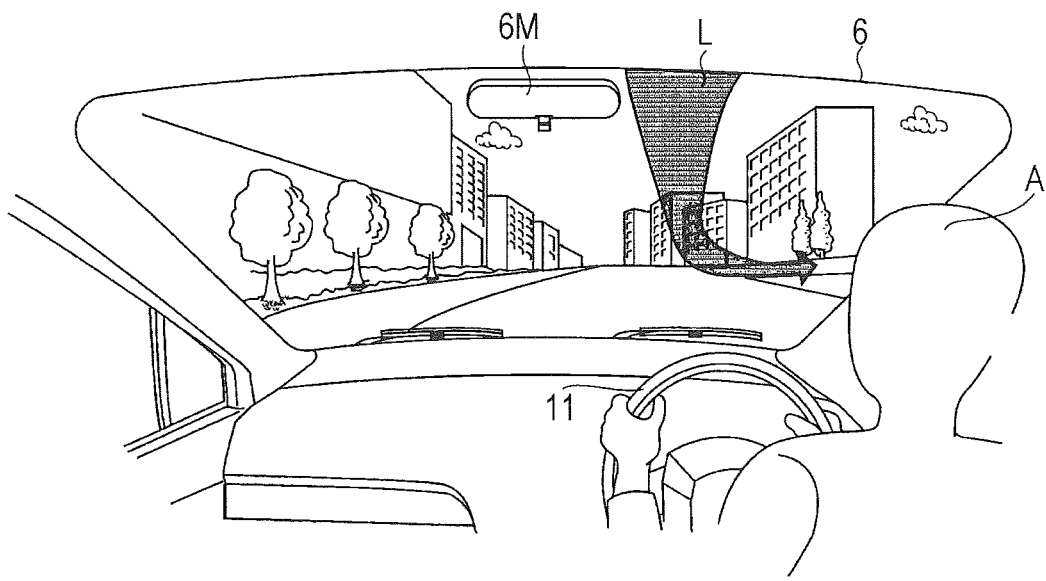
FIG. 5 is a figure illustrating an operation state including a representation on a windshield with the visual guidance system according to the first example of the present invention.

Subsequently, the processing unit 10 outputs image information in which the pointing end of the virtual line L processed on the basis of the route and the map information to the destination stored in the memory 20 is overlaid on the road surface thus recognized (step ST14). The pointing end of the virtual line L is seems to the driver as if it is touching the ground of the road surface. For instance, when there is no vehicle ahead and the driver turns right as illustrated in FIG. 5, the virtual line L is presented such that the road surface and the virtual line L overlap each other in front of the driver, so that the driver can clearly find the position for making a right turn.

As described above, in the windshield provided in front of the driver, the virtual line L is presented in an overlaid manner on the actual scenery and road, thereby reducing the burden imposed on the driver. By presenting it on the glass, the gaze can be guided without any auxiliary instruction such as voice and sound. This is because when there is a line, people have the habit of looking for an end thereof. Therefore, the driving direction can be guided naturally with the gaze during the cruising state, and the gaze of the driver can be guided so as to be suitable for the driving environment without causing the driver to be aware of it. Since the driving direction is presented with the line, road environment is not largely hidden, thereby allowing the driver to see both of the course guiding line and the road environment at the same time.

Second Example

FIGS. 6 to 10 illustrate a second example of the present invention. A visual guidance system according to the first example of the present invention will be described with reference to FIGS. 6 to 10.

Figure 6:
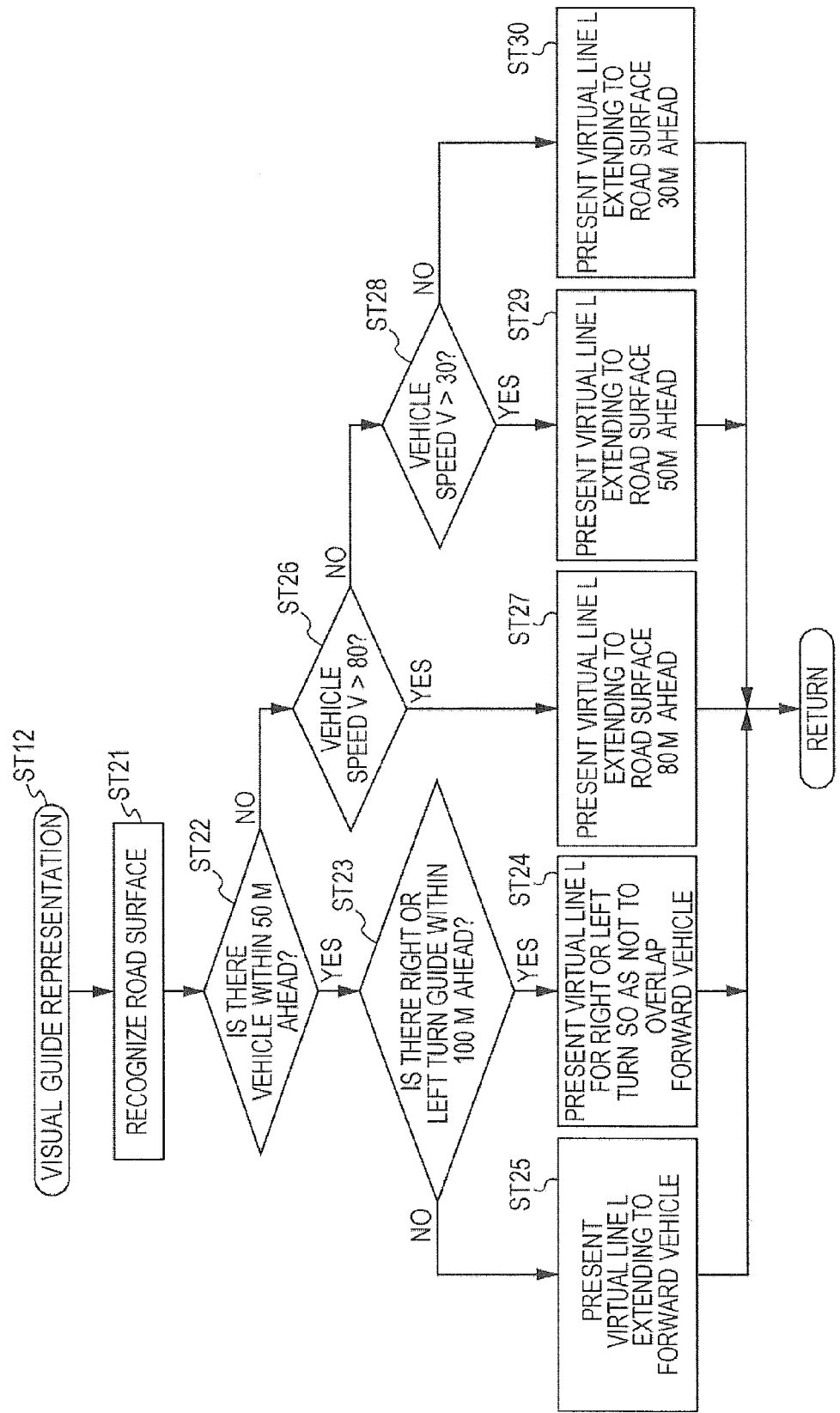
FIG. 6 is a flowchart illustrating a visual guide presenting procedure of a visual guidance system according to a second example of the present invention.

A visual guide presenting procedure of a visual guidance system will be described in detail with reference to FIGS. 6 to 10. FIG. 6 is a flowchart illustrating the visual guide presenting procedure of the visual guidance system according to the second example of the present invention. FIGS. 7 to 10 each illustrate an operation state including a representation on a windshield with the visual guidance system according to the second example of the present invention. In these figures, a driver A is at a closer side, and in front of the driver A, there are a windshield 6 and a mirror 6M in the cabin. The driver A sees a real image outside of the vehicle with through the windshield 6.

The road surface recognition unit 18 recognizes the road surface from an image which is captured by the stereo camera unit 8 and processed by the image processing unit 17, and sends this information to the processing unit 10. As a result, the road surface is recognized (step ST21). For instance, the detection is performed to find whether there is any forward vehicle within 50 meters ahead of the vehicle using the image captured by the stereo camera unit 8 and processed by the image processing unit 17 (step ST22). From the image captured by the stereo camera unit 8, the image processing unit 17 can detect a moving object, determine whether the object is a vehicle or not, and detect the distance to the object and the speed of the object.

Figure 7:
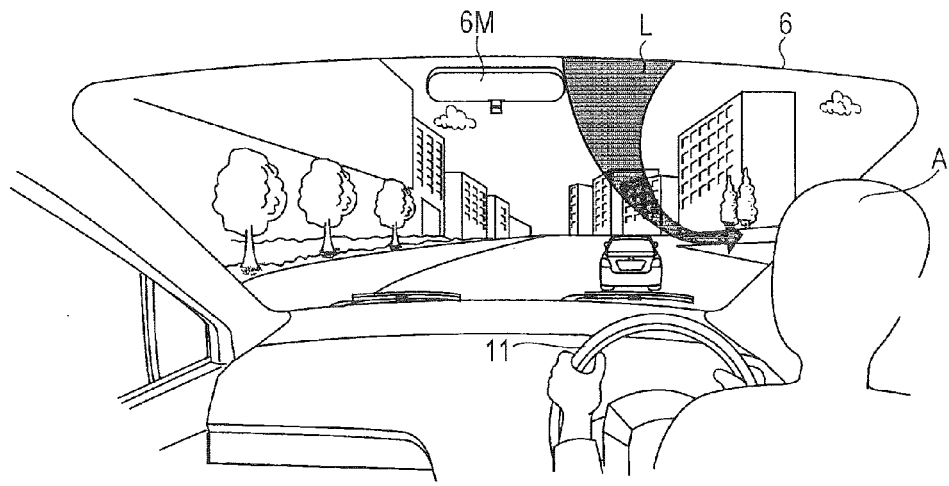
FIG. 7 is a figure illustrating an operation state including a representation on a windshield with the visual guidance system according to the second example of the present invention.

Subsequently, the processing unit 10 looks up route information, and, for instance, checks whether there is a guide to make a right or left turn within 100 meters ahead of the vehicle (step ST23). If there is a forward vehicle within 50 meters ahead of the vehicle and there is a guide to make a right or left turn within 100 meters ahead of the vehicle, the representation of the virtual visual guide overlaps the forward vehicle, and this makes it is difficult to clearly give a guide for making a right or left turn to the driver. Therefore, it is necessary to present the virtual line L so as not to overlap the vehicle ahead is captured by the stereo camera unit 8 (step ST24). As illustrated in FIG. 7, the representation is given in such a manner that the vehicle ahead and the virtual line L do not overlap each other.

Figure 8:
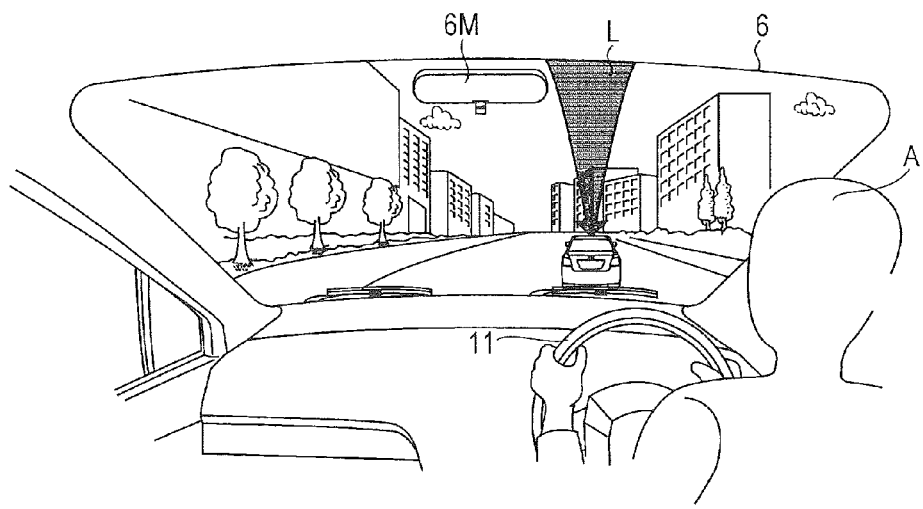
FIG. 8 is a figure illustrating an operation state including another representation on the windshield with the visual guidance system according to the second example of the present invention.
Figure 9:
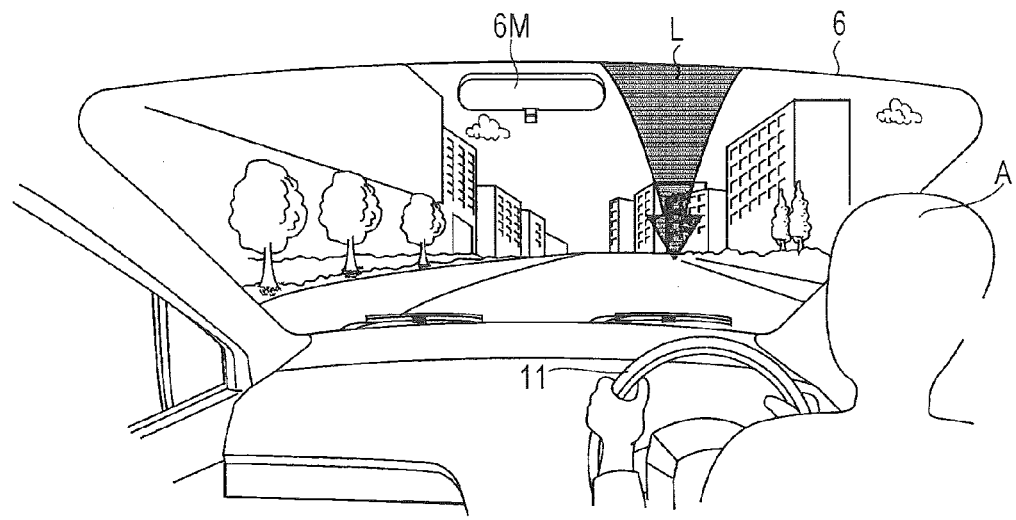
FIG. 9 is a figure illustrating an operation state including another representation on the windshield with the visual guidance system according to the second example of the present invention.

If there is a forward vehicle within 50 meters ahead of the vehicle and there is no guide for making a right or left turn within 100 meters ahead of the vehicle, it is be possible to drive the vehicle so to follow the forward vehicle, and it is necessary to pay attention to sudden braking of the forward vehicle. Therefore, a pointing end of the virtual line L is presented such that the pointing end points the forward vehicle (step ST25). For instance, as illustrated in FIG. 8, the virtual line L is presented such that it extends to the roof the forward vehicle. If there is no forward vehicle and the driver makes a right turn, the virtual line L is presented such that the road surface and the virtual line L overlap each other in front of the driver, so that the driver can clearly find the position for making a right turn, just like the case illustrated in FIG. 5 of the first example. If the processing unit 10 determines that there is no vehicle within 50 meters ahead on the basis of information given by the image processing unit 17, the processing unit 10 checks the speed of the vehicle given by a vehicle speed sensor 5 (step ST26). For instance, when the vehicle speed is more than 80 km/h, the virtual line L is presented in such a manner that the virtual line L is pointing the road surface 80 meters ahead (step ST27). As illustrated in FIG. 9, when the speed of the vehicle is high, the virtual line L is presented such that it extends to the road surface 80 meters ahead in order to guide the driver's gaze towards a distant position to which the driver has to pay attention.

Figure 10:
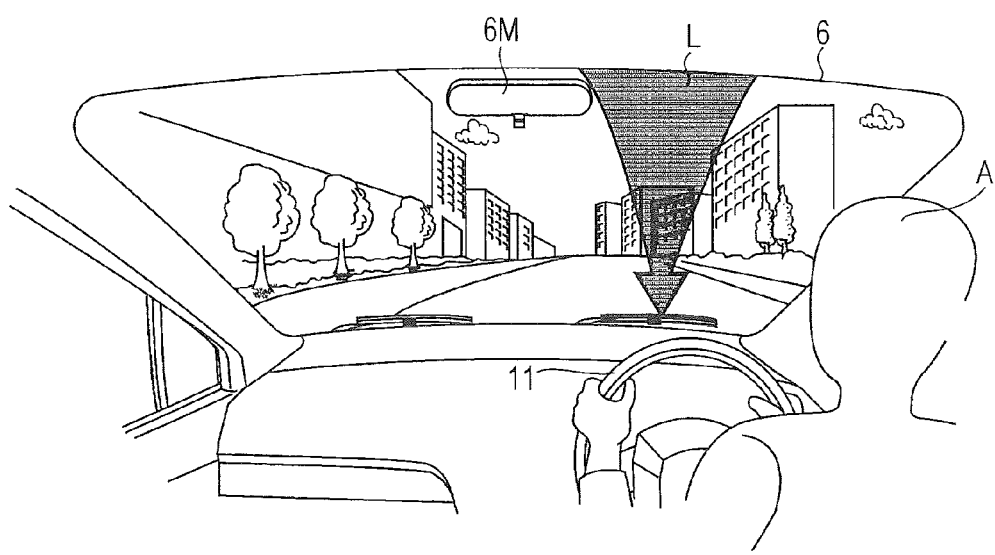
FIG. 10 is a figure illustrating operation state including another representation on the windshield with the visual guidance system according to the second example of the present invention.

When the vehicle speed is equal to or less than 80 km/h and more than 30 km/h (YES in step ST 28), the virtual line L is presented such that it extends to the road surface 50 meters ahead (step ST29). Further, for instance, when the vehicle speed is equal to or less than 30 km/h (NO in step ST28), the virtual line L is presented such that it extends to the road surface 30 meters ahead (step ST30). As illustrated in FIG. 10, when the speed of the vehicle is slow, the virtual line L is presented such that it extends to the road surface 30 meters ahead in order to guide the driver's gaze at around the forward of the vehicle to which the driver has to pay attention.

Third Example

Figure 11:
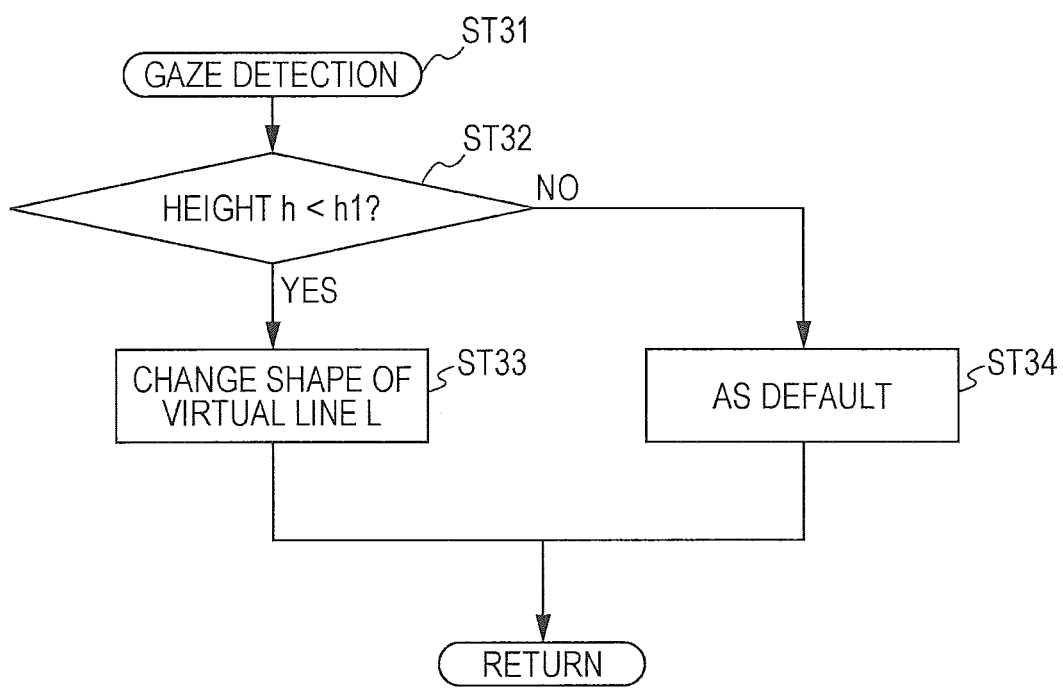
FIG. 11 is a flowchart illustrating a gaze detection procedure of a visual guidance system according to a third example of the present invention.
Figure 12:
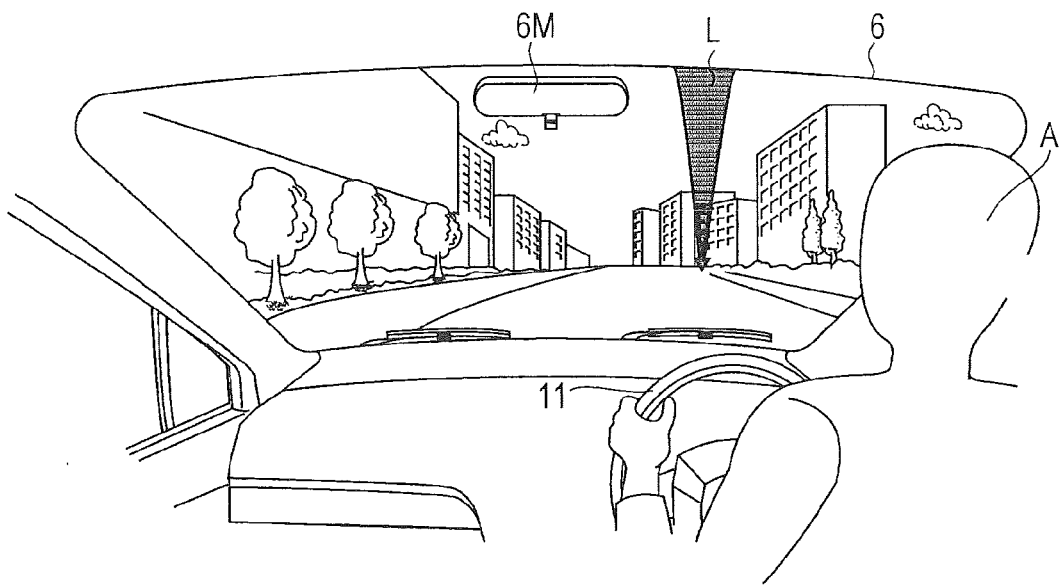
FIG. 12 is a figure illustrating an operation state including a representation on a windshield with the visual guidance system according to the third example of the present invention.

FIGS. 11 and 12 illustrate a third example of the present invention. A visual guidance system of according to the third example of the present invention will be described with reference to FIGS. 11 and 12.

Firstly, The representation of the virtual line L in accordance with the gaze of a driver will be described. FIG. 11 is a flowchart illustrating a gaze detection procedure of the visual guidance system according to the third example of the present invention. FIG. 12 is a figure illustrating an operation state including a representation on a windshield with the visual guidance system according to the third example of the present invention.

When a gaze height h1 of the driver detected by the gaze detection unit 9 is more than h (YES in step ST 32), the virtual line L is presented such that it can be easily seen by a driver whose seating height is high (step ST33). For instance, as illustrated in FIG. 12, the virtual line L is presented with a reduced width. When the gaze height h1 of the driver is equal to or less than h, the virtual line L is presented as a default (step ST34).

The gaze detection can be performed with an infrared camera that captures reflected light from the corneas. The gaze direction can also be determined by using an image sample. Specifically the eyes and the face of a study subject looking in a predetermined direction are captured by a camera, and the resultant image is registered to a measuring system in advance. Then the angles of the direction of the face of the driver are measured, and a summation of them both is calculated, so that the gaze direction can be identified.

In this case, the direction of the face is measured by detecting the positions of facial parts such as the eyes and a nose and an overall head portion of a person in the image, and the direction of the eyes is measured by detecting the positions of irises and an overall region of the eyes in the image. Then, the relationship of these positions is applied to a model of eyeballs to measure an angle with respect to the direction in front of the face.

As described above, a determination is made as to the shape of the virtual line L and as to whether or not to present the virtual line L, in accordance with information on the driving environment based on steering, braking and traction, information on the surroundings of the vehicle based on the image captured by a stereo camera unit 8, and information on the gaze state of the driver which is detected by the gaze detection unit 9. Taking the driving environment as an example, when the vehicle runs on an frozen road on which tires are likely to slip, it is safer to put the gaze at a distant position even if the vehicle speed is not high, and therefore, the pointing end of the virtual line L is presented so that the gaze is guided to a farther position than a normal position. On a mountainous road at night, the end portion of the virtual line L is put on the end of a corner and a start point of a subsequent corner, which prevents drifting away from the driving lane and prevents the vehicle body from spinning.

Figure 13:
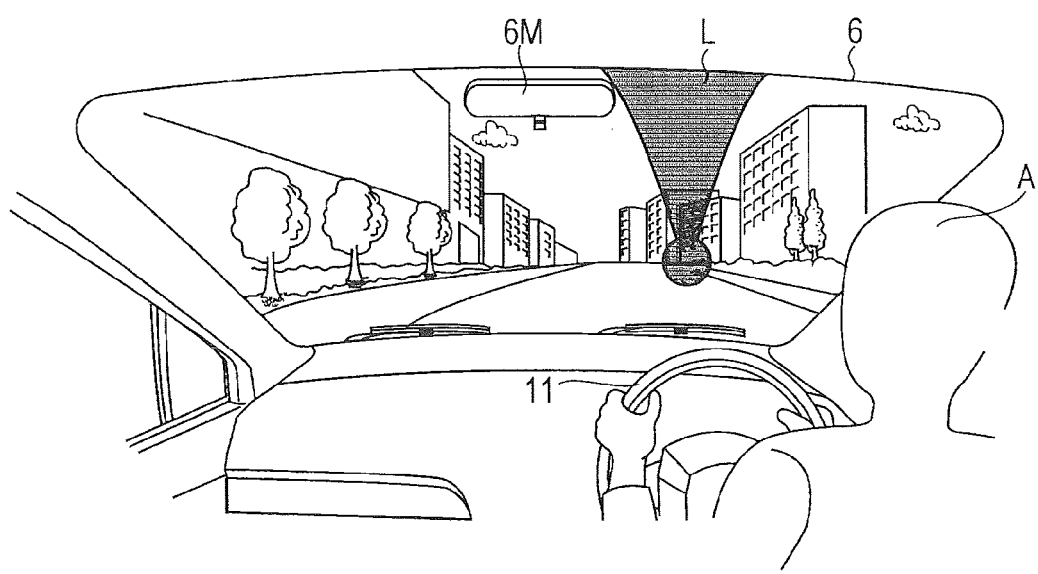
FIG. 13 is a figure illustrating an operation state including a representation on a windshield with a visual guidance system according to a fourth example of the present invention.
Figure 14:
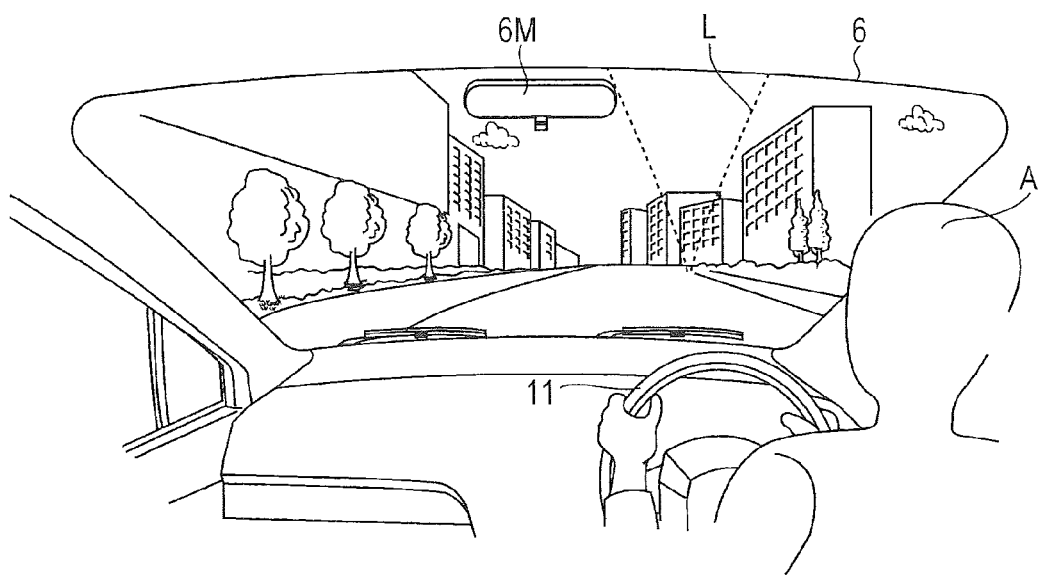
FIG. 14 is a figure illustrating an operation state including a representation on a windshield with a visual guidance system according to a fifth example of the present invention.
Figure 15:
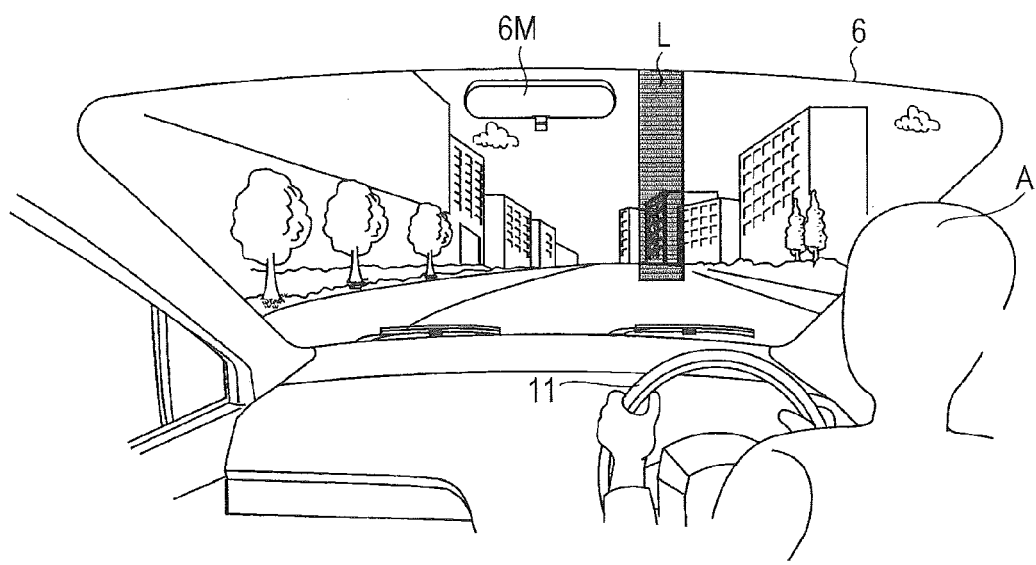
FIG. 15 is a figure illustrating an operation state including a representation on a windshield with a visual guidance system according to a sixth example of the present invention.

Other representations on a windshield will be shown with reference to FIGS. 13 to 15. FIG. 13 is a figure illustrating an operation state including a representation a windshield with a visual guidance system according to a fourth example of the present invention. FIG. 14 is a figure illustrating an operation state including a representation on a windshield with a visual guidance system according to a fifth example of the present invention. FIG. 15 is a figure illustrating an operation state including a representation on a windshield with a visual guidance system according to a sixth example of the present invention.

Fourth Example

FIG. 13 illustrates a fourth example of the present invention. A visual guidance system according to the fourth example of the present invention will be described with reference to FIG. 13.

In FIG. 13, a round shape (black circle) is presented a position where the virtual line L comes into contact with a road surface. This makes it easy to pay attention to the position. Accordingly, a driver can be clearly reminded of the center of vision to which the driver has to pay attention, and natural visual guidance can be achieved, thereby reducing a burden imposed on the driver.

Fifth Example

FIG. 14 illustrates a fifth example of the present invention. A visual guidance system according to the fifth example of the present invention will be described with reference to FIG. 14.

In FIG. 14, the edges of the virtual line L is presented with broken lines, and the line L is not filled in. Accordingly, the gaze of the driver is naturally guided while the driver is seeing the real scenery, thereby reducing a burden.

Sixth Example

FIG. 15 illustrates a sixth example of the present invention. A visual guidance system according to the sixth example of the present invention will be described with reference to FIG. 15.

In FIG. 15, the virtual line L is in a stick shape. Accordingly, a driver follows the stick-shaped virtual line L displayed in the, whereby the gaze of the driver is guided. In this case, a burden is low.

In the above, the shape and filling of the virtual line L are described, but the present invention is not limited thereto. For instance, the virtual line L may be changed by changing its width, color, edge type (such as a broken line, an alternate long and short dashed line), and the like, in real time in accordance with information on the surroundings of the vehicle, the driving environment, and a gaze state, and the like. The shape, color, and the like of only an end of the virtual line L to which the driver pays attention may be changed in accordance with the information.

Figure 16:
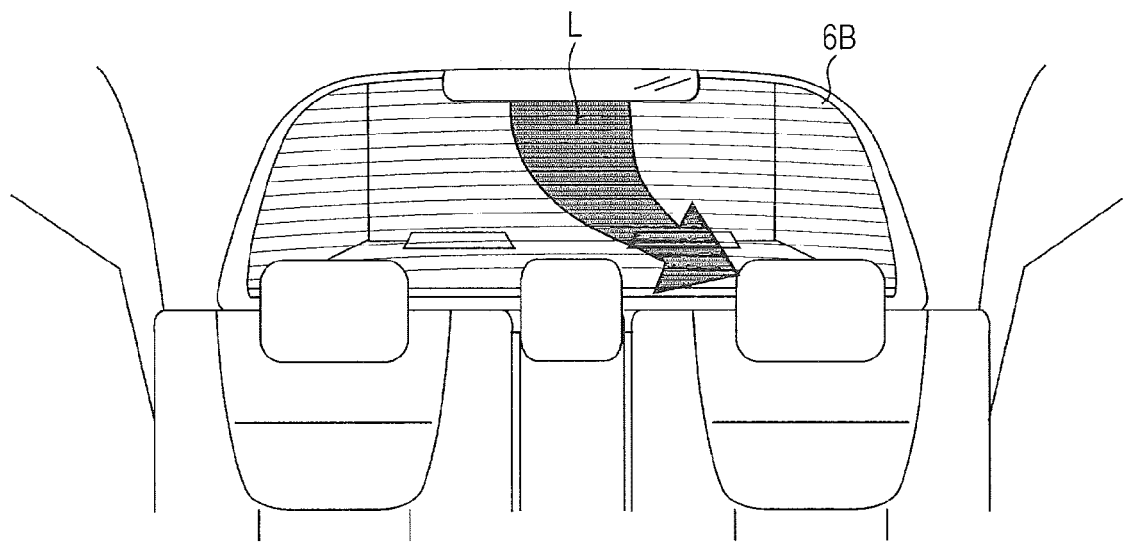
FIG. 16 is a figure illustrating an operation state a representation on a rear window with a visual guidance system according to a seventh example of the present invention.
Figure 17:
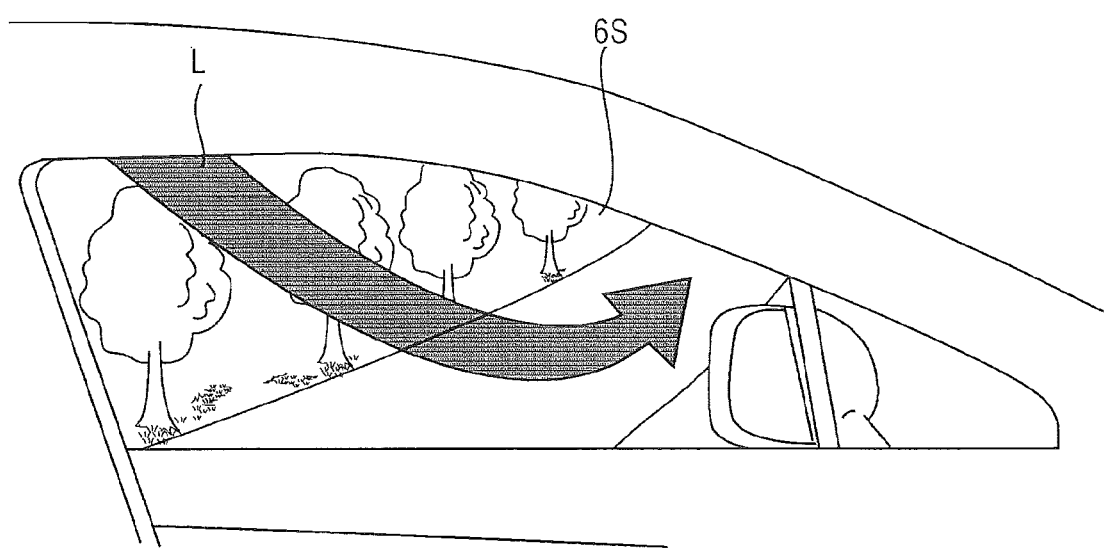
FIG. 17 is a figure illustrating operation state including a representation on a side window with a visual guidance system according to an eighth example of the present invention.

Next, presentations on a rear window 6B and a side window 6S will be shown with reference to FIGS. 16 and 17. FIG. 16 is a figure illustrating an operation state including a presentation on the rear window 6B with a visual guidance system according to a seventh example of the present invention. FIG. 17 is a figure illustrating an operation state including a presentation on the side window 6S with a visual guidance system according to an eighth example of the present invention.

Seventh Example

FIG. 16 illustrates the seventh example of the present invention. The visual guidance system of the present invention will be described with reference to FIG. 16.

In FIG. 16, when a vehicle moves backward, the rear window 6B is used to guide the route. Specifically, the virtual line L is presented so as to extend from the top of the rear window 6B to a road surface at the back of the vehicle. The representation is used as an assistant guide upon driving the vehicle into a garage and parking the vehicle, when the driver have to pay attention to the visual guide as well as the actual surroundings.

Eighth Example

FIG. 17 illustrates an eighth example of the present invention. A visual guidance system according to the eighth example of the present invention will be described with reference to FIG. 17.

In FIG. 17, a side window 6S is used to guide the route when a vehicle turns right or left. Specifically, the virtual line L is presented so as to extend from the bottom, top, a rear end, or front end of the side window 6S to a road surface where the vehicle is to be guided. In FIG. 17, the virtual line L extends from the rear-side top of the side window 6S to the road surface.

<Configuration and Effects of the Examples>

According to the above examples, the visual guidance system includes the video display to present an image overlaid on a windshield in front of a driver of a vehicle, and the processor to output image information on the image display. The processor outputs input information to present a virtual line extending from above the driver to a visual guidance target seen within the windshield such that the virtual line is overlaid on the windshield.

With the above configuration, the center of the visual field of the driver can be guided to a visual target seen within the windshield, and natural visual guidance can be achieved, thereby reducing a burden imposed on the driver.

According to the above examples, the processor output image information in which the virtual line extends from above the driver to along a route of the vehicle seen within the windshield such that a pointing end of the virtual line is overlaid on a road surface on the route seen within the windshield.

With the above configuration, the center of the visual field of the driver can be guided to the road surface in front of the vehicle, and natural visual guidance can be achieved, hereby reducing the burden imposed on the driver.

According to the above examples, the processor outputs image information to present the virtual line such that the pointing end of the virtual line becomes narrower.

With the above configuration, the center of the visual field of the driver can be guided naturally to the road surface in front of the vehicle in accordance with the width of the virtual line, and natural visual guidance can be given.

According to the above examples, the visual guidance system includes the vehicle speed detector to detect a speed of the vehicle, and the processor outputs image information to present the virtual line such that a pointing end of the virtual line extends to a point on the road surface far away from the driver in accordance with increase in the value of the vehicle speed.

With the above configuration, the center of the visual field of the driver can be guided to an appropriate place in accordance with speed information on the vehicle, and natural visual guidance can be achieved.

According to the present examples, the visual guidance system includes the steering input detector to detect a steering input, and the processor outputs image information to changing the representation of the virtual line when the steering input detector detects a steering input.

With the above configuration, the representation of the virtual line L is changed in accordance with steering information, and the driver can recognize that steering is performed, only by seeing the representation of the virtual line L without seeing anything else.

According to the above examples, the visual guidance system includes the braking input detector to detect a braking input, and when the braking operation detector detects a braking input, the processor outputs image information for changing representation of the virtual line.

With the above configuration, the representation of the virtual line L is changed in accordance with braking information, and the driver can recognize that braking is performed, only by seeing the display of the virtual line L without seeing anything else.

According to the present examples the visual guidance system includes the camera to capture an image within a visual field range of the driver in front of the vehicle, and a road surface recognizer to recognize the road surface in front of the vehicle, on the basis of the image captured by the camera. The processor outputs image information in which a pointing end of the virtual line is overlaid on the road surface thus recognized.

With the configuration as described above, the center of the visual field of the driver can be accurately guided to the road surface, whereby more natural visual guidance can be achieved.

According to the above examples, a stereo camera unit is used as the camera.

With the configuration as described above, the distance to the road surface and a forward vehicle can be recognized more accurately, and representation can be controlled in accordance with this information.

According to the present examples, the visual guidance system includes a gaze detector to detect a gaze of the driver, and the processor outputs image information to a representation that is suitable for the gaze height, gaze direction, or gaze state of the driver, in accordance with information provided by the gaze detector.

With the above configuration, appropriate representation can be achieved with smaller burden imposed on the driver in accordance with the gaze height, the gaze direction, or the gaze state of the driver.

According to the present examples, s the image projector to project an image onto the windshield servers as the image display, and the processor outputs image information for causing the image projector to change the representation of the virtual line in accordance with the vehicle speed provided by the vehicle speed detector, so that the virtual line seen by the driver extends from an upper edge of the windshield to a road surface.

With the above configuration, the center of the visual field of the driver can be guided to an appropriate place in accordance with information such as speed, and a guide can be presented in an easy-to-see manner in accordance with the actual scenery, information on other vehicles, and route guidance information.

<Definitions and the Like>

The visual guidance target according to the present invention includes a road surface on which the vehicle drives, other vehicles running in front of the vehicle or around the vehicle, a pedestrian, and an object fallen on the road.

The image display of the present invention is a transparent organic EL sheet and the like that shows an indication based on image information given by the processor and the image projector to project the image onto the windshield.

The virtual line of the present invention is a visible image such as a line and a dot presented or projected on the windshield such as a front windshield, a rear window, and a side window. The virtual line may be any indication as far as it is an indication capable of guiding the gaze of the driver.

The invention claimed is:

1. A visual guidance system comprising:
   a camera to capture an image within a visual field range of a driver in front of a vehicle;
   a road surface recognizer to recognize the road surface in front of the vehicle, on the basis of the image captured by the camera,
   an image display to present an image overlaid on a windshield in front of a driver of a vehicle; and
   a processor to output image information on the image display,
   wherein the processor outputs image information in which a pointing end of a virtual line is overlaid on the recognized road surface;
   wherein the processor outputs image information for presenting the virtual line which extends from above the driver to along a course of the vehicle seen within the windshield in such a manner that a pointing end of the virtual line is overlaid on a road surface on the course seen within the windshield,
   wherein the processor outputs image information which extends from above the driver to along a course of the vehicle seen within the windshield in such a manner that a pointing end of a virtual line is overlaid on a road surface on a course seen within the windshield as if the pointing end of the virtual line is touching the ground of the road surface,
   wherein the processor detects a forward vehicle ahead of the vehicle and checks whether there is a point of guide making a right turn or a left turn, ahead of the vehicle, and
   in a case of when the forward vehicle ahead of the vehicle is closer than the point of guide and when the forward vehicle ahead of the vehicle does not exist within the point of guide, a representation of the virtual line and the point end are presented in a different manner.

2. The visual guidance system according to claim 1, wherein the processor outputs image information for presenting the virtual line in such a manner that a pointing end of the virtual line becomes narrower.

3. A visual guidance system comprising:
   a camera to capture an image within a visual field range of a driver in front of a vehicle;
   a road surface recognizer to recognize a road surface in front of the vehicle, on a basis of the image captured by the camera,
   an image display to present an image overlaid on a windshield in front of the driver of the vehicle;
   a processor to output image information on the image display; and
   a vehicle speed detector to detect the speed of the vehicle,
   wherein the processor outputs image information in which a pointing end of a virtual line is overlaid on the recognized road surface;
   wherein the processor outputs image information for presenting the virtual line extending from above the driver to a visual guidance target seen within the windshield in such a manner that the virtual line is overlaid on the windshield,
   wherein the processor outputs image information which extends from above the driver to along a course of the vehicle seen within the windshield in such a manner that a pointing end of the virtual line is overlaid on a road surface on a course seen within the windshield,
   wherein the processor outputs image information for presenting the virtual line in such a manner that:
     when the speed of the vehicle is greater than or equal to a predetermined value, the pointing end of the virtual line is presented such that it extends to the road surface of a distance corresponding to a speed ahead in order to guide a gaze of the driver towards a distant position to which the driver has to pay attention thereto, and
     when the speed of the vehicle is less than a predetermined value, the pointing end of the virtual line is presented such that it extends to the road surface of a distance corresponding to the speed ahead in order to guide the gaze of the driver to around the forward of the vehicle to which the driver has to pay attention.

4. The visual guidance system according to claim 1, further comprising:
   a steering input detector to detect a steering input,
   wherein the processor outputs image information for changing the representation of the virtual line when the steering input detector detects a steering input.

5. The visual guidance system according to claim 1, further comprising:
   a braking input detector to detect a braking input,
   wherein, when the braking input detector detects a braking input, the processor outputs image information for changing the representation of the virtual line.

6. The visual guidance system according to claim 1, wherein the camera comprises a stereo camera unit.

7. The visual guidance system according to claim 1, further comprising:
   a gaze detector to detect a gaze of the driver,
   wherein the processor outputs image information for a representation that is suitable for the gaze height, gaze direction, or gaze state of the driver, in accordance with information provided by the gaze detection unit, and when a gaze height of the driver is equal to or less than a predetermined value, the virtual line is presented with a reduced width.

8. The visual guidance system according to claim 3, wherein the image display comprises an image projector to project an image onto the windshield; and the processor outputs image information for causing the image projector to change the representation of the virtual line in accordance with the vehicle speed provided by the vehicle speed detector, so that the virtual line seen by the driver extends from the upper edge of the windshield to a road surface.

9. A visual guidance system comprising:

a camera to capture an image within a visual field range of a driver in front of a vehicle;

a road surface recognizer to recognize the road surface in front of the vehicle, on the basis of the image captured by the camera, an image display to present an image overlaid on a windshield in front of a driver of a vehicle; and a processor to output image information on the image display, wherein the processor outputs image information in which a pointing end of a virtual line is overlaid on the recognized road surface;

wherein the processor outputs image information for presenting the virtual line which extends from above the driver to along a course of the vehicle seen within the windshield in such a manner that a pointing end of the virtual line is overlaid on a road surface on the course seen within the windshield, and wherein the processor outputs image information which extends from above the driver to along a course of the vehicle seen within the windshield in such a manner that a pointing end of a virtual line is overlaid on a road surface on a course seen within the windshield such that the pointing end of the virtual line is touching the ground of the road surface.

10. The visual guidance system according to claim 9, wherein the pointing end of the virtual line is changed in order to guide a gaze of the driver based on a vehicle speed.

11. The visual guidance system according to claim 9, wherein the pointing end of the virtual line is changed based on a vehicle speed.

12. The visual guidance system according to claim 9, further comprising:

a gaze detector to detect a gaze of the driver, wherein the processor outputs image information for a representation that is suitable for the gaze height, gaze direction, or gaze state of the driver, in accordance with information provided by the gaze detection unit, and when a gaze height of the driver is equal to or less than a predetermined value, the virtual line is presented with a reduced width.

13. The visual guidance system according to claim 9, further comprising:

a gaze detector to detect a gaze of the driver, the gaze of the driver dynamically changing based on a position of a body of the driver inside of the vehicle.

14. The visual guidance system according to claim 1, further comprising:

a gaze detector to detect a gaze of the driver, the gaze of the driver dynamically changing based on a position of a body of the driver inside of the vehicle.

15. The visual guidance system according to claim 9, further comprising:

a gaze detector to detect a gaze of the driver, the gaze of the driver dynamically changing based on a predetermined condition.

16. The visual guidance system according to claim 1, further comprising:

a gaze detector to detect a gaze of the driver, the gaze of the driver dynamically changing based on a predetermined condition.

* * * * *